May 7, 1940.  LE ROY J. LEISHMAN  2,200,003
TRANSMISSION FOR AUTOMATIC TUNERS
Filed Nov. 29, 1937
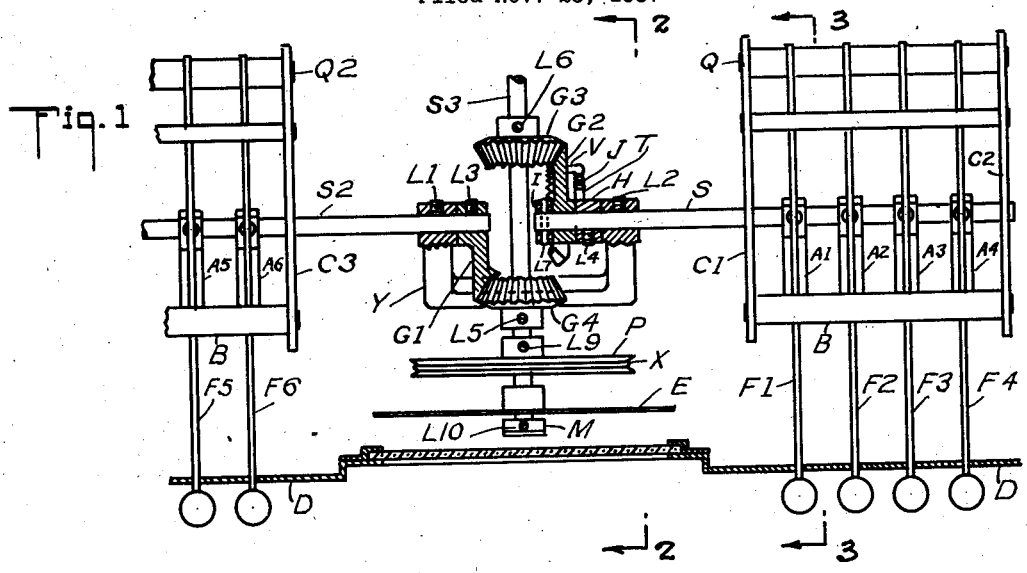
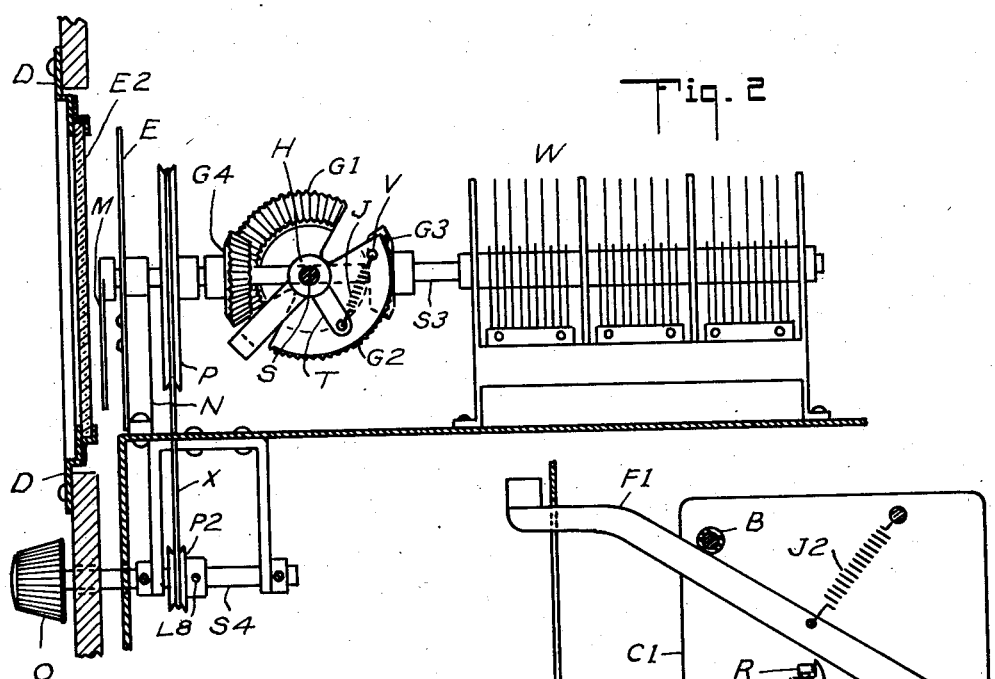
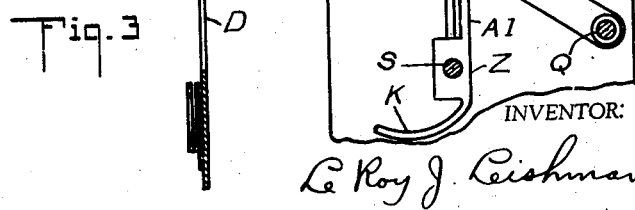
INVENTOR:
Le Roy J. Leishman Patented May 7, 1940

2,200,003

UNITED STATES PATENT OFFICE 2,200,003

TRANSMISSION FOR AUTOMATIC TUNERS

Le Roy J. Leishman, Los Angeles, Calif.

Application November 29, 1937, Serial No. 177,061

16 Claims. (Cl. 74—10)

This invention relates to control mechanisms for electrical apparatus, and more particularly to means for transmitting rotary motion from a semi-automatic tuning device to the various moving parts of a radio set that are operatively connected with such tuners. Manually operated self-positioning tuning devices should operate as easily as possible and should tune in the desired stations with great accuracy. To achieve these ends, the manual control and the transmission to the gang condenser and dial should not appreciably increase the pressure required to operate the tuner, and there must be no lost motion between the tuner and the condenser and dial. When gears are a part of the transmission system, means must be employed to eliminate play between the teeth without increasing the friction perceptibly. It is especially difficult to do this when bevel gears are used. The present invention is concerned with the solution of the problems involved in these considerations. Its objects are to make it possible to transmit motion from a tuning shaft to another shaft at right angles with no lost motion; to eliminate play in a bevel gear train without greatly increasing the friction; to afford a frictionless transmission of rotatory motion in such a system to the dial; and to simplify the manual drive for radio sets having automatic tuners with selectively movable members that are individual to each of a group of predetermined stations. Other objects will appear as this description proceeds.

In the accompanying drawing:

Fig. 1 is a plan view, partly in section, of a group of manually operable levers, automatic shaft positioning means, a dial, a pulley, a control shaft, and a bevel gear arrangement for transmitting motion from the levers to these other parts.

Fig. 2 is a section of Fig. 1 taken on line 2—2 plus a gang condenser and manual tuning knob connected by a belt to the pulley shown in Fig. 1.

Fig. 3 is a section taken on line 3—3 of Fig. 1, showing a side elevation of one operating lever and a shaft-positioning member such as may be used in automatic tuners of the general type to which the present invention is applicable.

In Fig. 1, the manually operable levers F1, F2, F3 and F4 are pivoted on rod Q journaled in a pair of end-plates C1 and C2. Levers F5 and F6 are pivoted on rod Q2, one end of which is shown journaled in end-plate C3. Positionable levers or cams A1, A2, A3 and A4 are mounted on shaft S, and similar levers or cams A5 and A6 are shown mounted on shaft S2. Shaft S3 lies in the same plane as shafts S and S2, as will be seen from Fig. 2. It is thus impossible for shafts S and S2 to be replaced by one straight shaft, and they are therefore yoked together by yoke Y, connected to shaft S2 by screw L1, Fig. 1, and to shaft S by screw L2. The automatic tuning mechanism turns considerably less than 180 degrees (usually only 90 degrees), and the yoke may therefore turn freely on either side of shaft S3, according to the preference of the designer.

Partial gear G1 is connected to shaft S by screw L3, or it may be connected to the yoke. Gear G1 meshes with gear G4, connected to shaft S3 by screw L5. Gear G3 is also mounted on shaft S3 and is fastened thereto by screw L6. Gear G3 meshes with partial gear G2, which is free to turn on shaft S between collar I, fastened to the shaft by pin L7, and arm T, affixed to the shaft by screw L4 in hub H of arm T. One end of spring J is fastened to pin V in partial gear G2, and the other end of the spring is fastened to arm T, Fig. 2. This spring must be strong enough to turn the gang condenser and manual drive, and its action is to pull partial gear G2 toward arm T and rotate gear G3 until the teeth of gear G4 press against the teeth of partial gear G1, removing all the play.

The tubing knob O, Fig. 2, is affixed to shaft S4 carrying pulley P2 fastened thereon by screw L8. Pulley P2 drives pulley P by means of belt X, which may be of a self-tightening type or a cord having ends connected by a spring.

Shaft S3 is journaled in bracket N which also supports the dial E. An indicator or pointer is attached to the outer end of shaft S3 by means of screw L10. Shaft S3, as illustrated, is the shaft of tuning condenser gang W, but may obviously be a separate shaft connected to the condenser shaft by a suitable coupling.

Assuming that the parts described are components of an operating radio receiver, it will be obvious that the set may be tuned by knob O and the dial readings seen through the transparent dial E2 supported by escutcheon D.

Although the particular type of manually operated self-positioning tuner employed is no part of this invention, the setting of such a tuner will be explained by reference to Fig. 3, which is a cross section of Fig. 1 taken on line 3—3 and illustrates the mechanism of a tuner now well known in the art. If lever F1 is pressed down, the positionable member A1 will move in a counter-clockwise direction until the long edge Z and the lower edge of lever F1 coincide. If A1 is to be adjusted so that operating lever F1 will tune in a predetermined station, the lever is held down, set-screw R loosened, the desired station tuned in manually, and set-screw R tightened again. Regardless of the angular position in which shaft S may thereafter be found, the pressing of lever F1 will turn the shaft to the exact position that it occupied when set-screw R was tightened. It will therefore be evident that members A2, A3, A4, A5 and A6, Fig. 1, may all be set for different stations that will be automatically tuned in when the proper operating lever is pressed.

The bevel-gear arrangement described transmits the rotation of shafts S and S2 to shaft S3 without any lost motion. The gear ratio is 2:1, and condenser W may therefore be turned throughout the customary range of 180 degrees when connected to an automatic tuning mechanism with a maximum rotation of 90 degrees. No load is added by the dial transmission, as the dial indicator is mounted on the condenser shaft or another shaft connected directly thereto. The manual drive adds only a small load, as the transmission is a simple one between two parallel shafts.

It will be obvious that it is immaterial which gear bears the play-removing spring so long as such gear is otherwise free to rotate on its shaft.

Various other modifications may be made from the embodiments shown and described without departing from the spirit of the invention.

My claims are:

1. In a mechanism for angularly positioning a control element of a radio device, a combination including: a first shaft; a second shaft and a third shaft substantially in axial alignment with each other and lying on opposite sides of said first shaft and in substantially the same plane as said first shaft; a U-shaped member attached to said second and third shafts; and a bevel gear connection between said first and second shafts.

2. In a mechanism for angularly positioning a control element of a radio device, a combination including: a first shaft; a second shaft and a third shaft substantially in axial alignment with each other and lying on opposite sides of said first shaft and in substantially the same plane as said first shaft; a yoke attached to said second and third shafts; two gears on said first shaft; a gear on said second shaft meshing with only one of said gears on said first shaft; and a gear on said third shaft meshing with the other gear on said first shaft.

3. In a mechanism for angularly positioning a control element, a combination including: a first shaft; a second shaft and a third shaft substantially in axial alignment with each other and lying on opposite sides of said first shaft and in substantially the same plane as said first shaft; a U-shaped member attached to said second and third shafts; two gears on said first shaft; a gear on said second shaft meshing with only one of said gears on said first shaft; a gear on said third shaft meshing with the other gear on said first shaft; one of said gears free to rotate on its shaft; and a spring adapted to turn said latter gear.

4. In a mechanism for angularly positioning a control element of a radio device, a combination including: two shafts substantially at right angles; two gears mounted on one of said shafts; and two axially aligned segment gears connected by means comprising a yoke; one of said latter gears mounted on the other of said shafts; each gear meshing with only one other of said gears.

5. In a mechanism for angularly positioning a control element, a combination including: two shafts substantially at right angles; two gears mounted on one of said shafts; two axially aligned gears connected by means comprising a U-shaped member; one of said latter gears mounted on the other of said shafts; each of said latter gears meshing with one of said first-mentioned gears; one of said gears free to rotate on its shaft; and a spring having a connection to said free gear and to the shaft carrying said free gear.

6. In a mechanism for angularly positioning a control element, a combination including: a first shaft; a second shaft and a third shaft substantially in axial alignment with each other and lying on opposite sides of said first shaft and in substantially the same plane as said first shaft; a yoke connection between said second and third shafts; a bevel gear connection between said first and second shafts; an operating means for turning said second shaft in either direction upon movement of said means in one direction; and an operating means for turning said third shaft in either direction upon movement of said latter means in one direction.

7. In a mechanism for angularly positioning a control element of a radio device, a combination including: a first shaft; a second shaft and a third shaft substantially in axial alignment with each other and lying on opposite sides of said first shaft and in substantially the same plane as said first shaft; means for connecting said second and third shafts so that they turn substantially as a unit; two gears on said first shaft; a gear on said second shaft meshing with only one of said gears on said first shaft; a gear on said third shaft meshing with the other gear on said first shaft; one of said gears free to rotate on its shaft; a spring adapted to turn said latter gear; an operating means for turning said second shaft in either direction upon movement of said operating means in one direction; and an operating means for turning said third shaft in either direction upon movement of said latter operating means in one direction.

8. In a mechanism for angularly positioning a control element of a radio device, a combination including: two shafts substantially at right angles; two gears mounted on one of said shafts; two axially aligned gears connected by means comprising a yoke; one of said latter gears mounted on the other of said shafts; each of said latter gears meshing with one of said first-mentioned gears; and an operating means for turning one of said shafts in either direction upon movement of said means in one direction.

9. In a mechanism for angularly positioning a control element of a radio device, a combination including: two shafts substantially at right angles; two gears mounted on one of said shafts; two axially aligned gears connected by means comprising a U-shaped member; one of said latter gears mounted on the other of said shafts; each of said latter gears meshing with one of said first-mentioned gears; and a plurality of selectively operable devices for turning said shafts in either direction upon movement of one of said devices in one direction, each of said devices adapted to rotate said shafts to an angular position predetermined by the adjustment of said device.

10. In a mechanism for angularly positioning a control element of a radio device, a combination including: two shafts substantially at right angles; two gears mounted on one of said shafts; two axially aligned gears connected by means comprising a yoke; one of said latter gears mounted on the other of said shafts; each of said latter gears meshing with one of said first-mentioned gears; one of said gears free to rotate on its shaft; a spring having a connection to said latter gear and to said latter shaft; and an operating device for turning one of said shafts in either direction upon movement of said device in one direction.

11. In a mechanism for angularly positioning a control element of a radio device, a combination including: two shafts substantially at right angles; two gears mounted on one of said shafts; two axially aligned gears connected by means comprising a U-shaped member; one of said latter gears mounted on the other of said shafts; each of said latter gears meshing with one of said first-mentioned gears; one of said gears free to rotate on its shaft; a spring having a connection to said latter gear and to said latter shaft; and a plurality of selectively operable devices for turning said shafts in either direction each of said devices adapted upon movement in one direction to rotate said shafts to a predetermined position.

12. In a mechanism for angularly positioning a control element of a radio device, a combination including: two shafts substantially at right angles; two gears mounted on one of said shafts; two axially aligned gears connected by means comprising a yoke; one of said latter gears mounted on the other of said shafts; each of said latter gears meshing with one of said first-mentioned gears; one of said gears free to rotate on its shaft; a spring having a connection to said latter gear and to said latter shaft; an operating means for turning one of said shafts in either direction upon movement of said latter means in one direction; and a tuning condenser operated by the other of said shafts.

13. In a mechanism for angularly positioning a control element of a radio device, a combination including: two shafts substantially at right angles; two gears mounted on one of said shafts; two axially aligned gears connected by means comprising a U-shaped element; one of said latter gears mounted on the other of said shafts; each of said latter gears meshing with one of said first mentioned gears; one of said gears free to rotate on its shaft; a spring having a connection to said latter gear and to said latter shaft; an operating means for turning one of said shafts in either direction upon movement of said operating means in one direction; resonance-varying means; a calibrated member and an indicating member; said other shaft adapted to cause relative movement between said members and having an operating connection to said resonance-varying means.

14. In a mechanism for angularly positioning a control element of a radio device, a combination including: two shafts substantially at right angles; two gears mounted on one of said shafts; two axially aligned gears connected by means comprising a yoke; one of said latter gears mounted on the other of said shafts; each of said latter gears meshing with one of said first-mentioned gears; one of said gears free to rotate on its shaft; a spring having a connection to said latter gear and to said latter shaft; an operating means for turning one of said shafts in either direction upon movement of said latter means in one direction; resonance-varying means; a calibrated member and an indicating member; said other shaft operatively connected to said resonance-varying means; and means for producing relative motion between said members upon rotation of said latter shaft.

15. In a mechanism for angularly positioning a control element of a radio device, a combination including: two shafts substantially at right angles; two gears mounted on one of said shafts; two axially aligned gears connected by means comprising a U-shaped element; one of said latter gears mounted on the other of said shafts; each of said latter gears meshing with one of said first-mentioned gears; one of said gears free to rotate on its shaft; a spring having a connection to said latter gear and to said latter shaft; an operating means for turning one of said shafts in either direction upon movement of said means in one direction; a resonance-varying means; a calibrated member; an indicating member; said other shaft adapted to produce relative movement between said members and having a direct connection to said resonance varying means; a rotatable manual tuning control mounted on a third shaft parallel to the shaft connected to said resonance-varying means; a pulley on said third shaft; a pulley on the shaft connected to said resonance-varying means; and a belt around said pulleys.

16. In a mechanism for angularly positioning a control element of a radio device, a combination including: two shafts substantially at right angles; two gears mounted on one of said shafts; two axially aligned gears connected by means comprising a yoke; one of said latter gears mounted on the other of said shafts; each of said latter gears meshing with one of said first-mentioned gears; one of said gears free to rotate on its shaft; a spring having a connection to said latter gear and to said latter shaft; an operating means for turning one of said shafts in either direction upon movement of said operating means in one direction; a resonance-varying means; a calibrated member; an indicating member adjacent said calibrated member and adapted to cooperate therewith; said other shaft having a direct connection to one of said members and to said resonance-varying means; a rotatable manual tuning control mounted on a third shaft parallel to the shaft connected to said resonance-varying means; a pulley on said third shaft; a pulley on the shaft connected to said resonance-varying means; and a belt around said pulleys.

LE ROY J. LEISHMAN.